Oct. 22, 1935.  L. E. FREEMAN ET AL  2,018,550

CENTERING GAUGE

Filed Oct. 6, 1933

INVENTORS
Lloyd E. Freeman
Fred V. Clancy
John A. Naismith
ATTORNEY

Patented Oct. 22, 1935

2,018,550

UNITED STATES PATENT OFFICE 2,018,550

CENTERING GAUGE

Lloyd E. Freeman and Fred V. Clancy,
San Jose, Calif.

Application October 6, 1933, Serial No. 692,489

2 Claims. (Cl. 33—180)

The present invention relates particularly to means for checking the centering and clearances of vehicle-wheel brake-shoe assemblies relative to the drums against which they operate, and also for checking the condition of the drums.

It is one object of the invention to provide a gauge of the character indicated so constructed and operated as to be quickly and accurately adjusted to the wearing surface of a brake drum, and one in which the effecting of said adjustment automatically centers the gauge in the said drum.

It is another object of the invention to provide a gauge of the character indicated that may be accurately mounted upon the axle carrying the drum with its axis coinciding with the axis of the axle.

It is still another object of the invention to provide a gauge wherein the setting for the internal diameter of the drum and the external diameter of the brake shoes, and for its centering in the drum, is accomplished in the one adjustment.

Still other objects are to provide a gauge for checking the vertical and horizontal disposition of surfaces relative to a given axis; for taking the internal or external diameters of objects and instantly checking those measurements with the internal or external diameters of other or like objects.

Finally, it is an object of the invention to provide a gauge of the character indicated that will be economical to manufacture, that consists of few parts, that is simple in form and construction, strong, durable, and highly efficient in its practical application.

Figure 1:
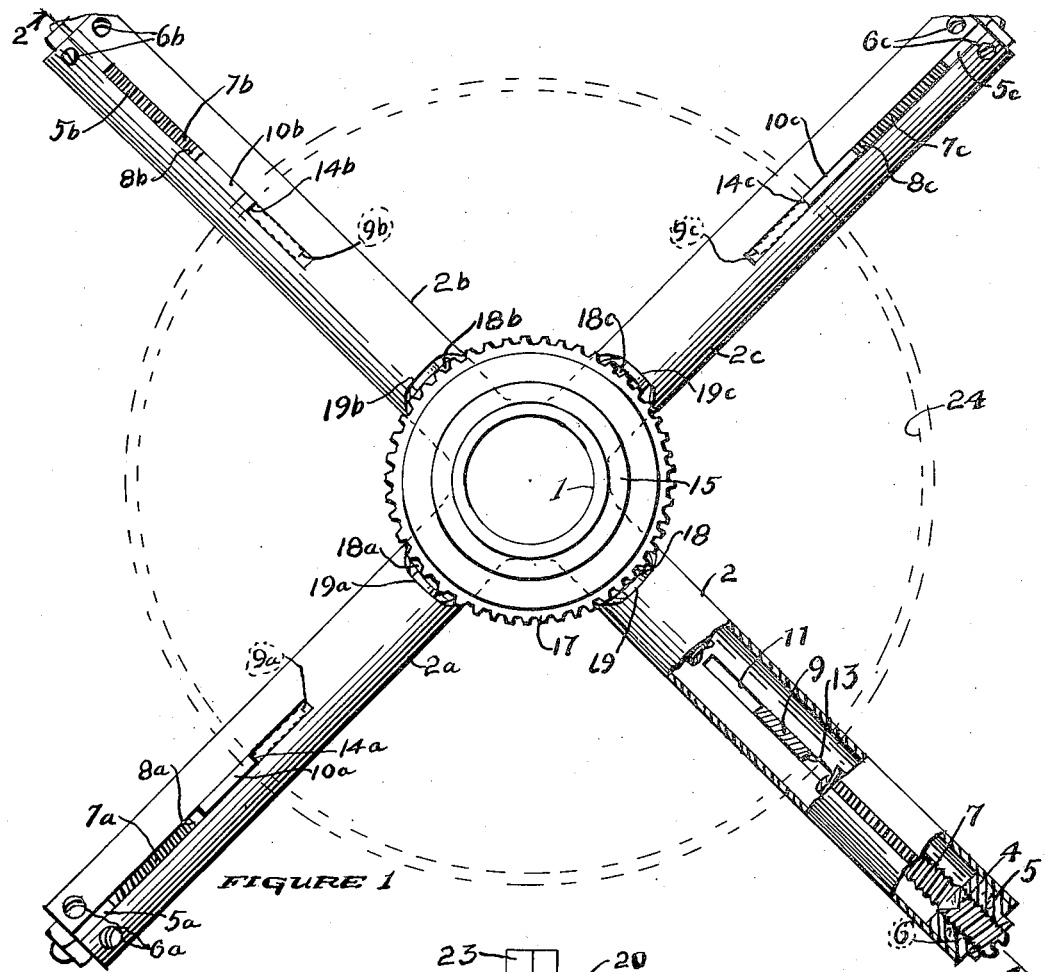
Figure 1 is a plan view of a gauge embodying our invention, partly in section, and with parts broken away.
Figure 2:
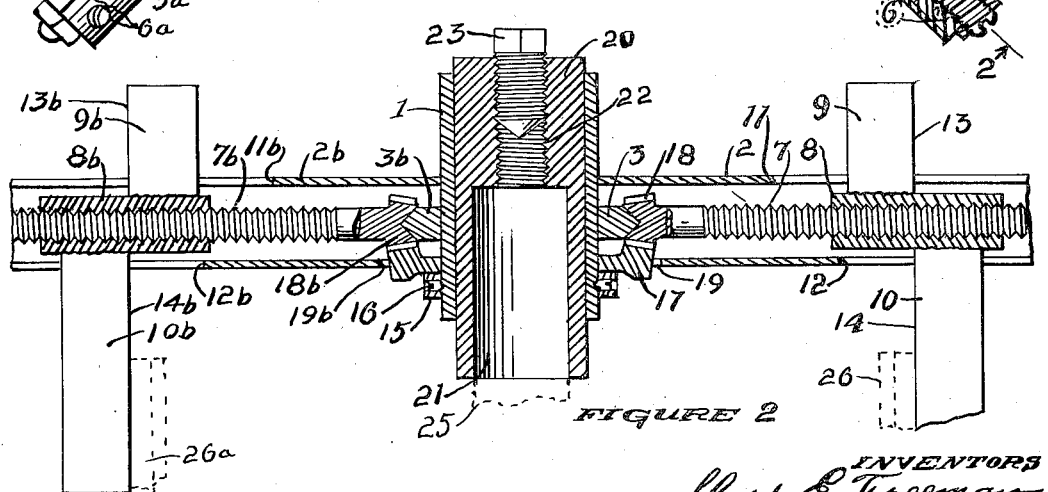
Figure 2 is a sectional view on line 2—2 of Figure 1, with parts broken away.

In the embodiment of the invention herein disclosed, we show at 1 a tubular hub open at both ends and having four equally spaced and radially disposed tubular arms mounted thereon, as by welding, to form an integral part thereof. The longitudinal axes of these arms are all disposed in one plane at right angles to the axis of hub 1, the several arms being indicated by the reference characters 2, 2a, 2b, 2c.

It is to be understood that the several arms and the parts mounted therein are identical in every respect, and that the detailed description of one arm applies equally as well to each of the others.

At 3 and 4 are shown two dead centers disposed in opposed relation to each other and in axial alignment. The part 3 is mounted on the hub 1 and within the arm 2, its axis coinciding with that of the said arm, and the part 4 is threaded into a nut 5 removably secured in the outer end of the arm by screws 6.

At 7 is a threaded spindle mounted to rotate in the dead centers 3 and 4. Threaded on to the spindle 7 is a sleeve 8 provided with oppositely directed arms 9 and 10 passing through slots 11 and 12, respectively, in opposite sides of arm 2. The outer edge 13 of arm or gauge plate 9 is straight and is parallel with the axis of hub 1, and the inner edge 14 of gauge plate 10 is also a straight-edge and is aligned with edge 13 of plate 9. The plate 10 is longer than plate 9 for the purpose hereinafter described.

Revolubly mounted on hub 1 and held in place by means of a collar 15 and set screws 16, is a bevel gear 17 meshing with a pinion 18 on spindle 7, and of course with pinions 18a, 18b and 18c on their respective spindles. An opening 19 is formed in tube or arm 2 to permit the operation of the gear as described.

The oppositely directed spindles 7—7b and 7a—7c are provided with right and left threads respectively so that when the gear 17 is rotated all of the gauge plates are moved an equal degree in the same direction with respect to the center of the hub 1.

Slidably mounted in the hub 1 is a bearing member 20 formed at 21 to slidably engage the end of a vehicle axle, and tapped at 22 to engage the threaded pin on the end of said axle. At 23 is shown a set-screw mounted in the member 20, its axis of rotation being concentric with the axis of the hub, bearing member, and axle.

In using the device for recentering the brake shoes of an automobile wheel the brake drum is removed from the wheel, and the device is laid upon it with the four gauge plates 9, 9a, 9b, 9c within the same. The gear 17 is now operated to move all of the said gauge plates outwardly into engagement with the wearing surface of the drum, this operation automatically centering the hub 1 in the drum. By rotating the device in the drum the condition of the wearing surface, indicated in dotted lines at 24, may be readily ascertained.

When the bearing member 20 is in place on the axle, indicated in part in dotted lines at 25, the set-screw 23 is operated to seat in the conical indentation, or center, found in the end of each axle end, where sufficient pressure is brought to bear to exert a pull on the bearing member. This operation seats the threads of the bearing member firmly against the threads of the axle and positively supports the member in true axial alignment with the end portion of the axle upon which it is mounted. This is an important feature of the invention because it is the accurate mounting of the bearing member on the axle that permits accurate application of the device in the manner described.

The gauge plates having been adjusted as above described, the device is now removed from the drum and slidably mounted upon the bearing member 20 with the gauge plates 10, 10a, 10b, 10c overlying the brake shoes, indicated in part in dotted lines at 26, 26a. Since the working edges of these gauge plates are in accurate alignment with the working edges of the gauge plates 9 to 9c, it follows that the brake shoes may be set to these plates and the highest possible degree of accuracy obtained between their wearing surfaces and that of the drum in which they are mounted.

Since the spindles 7 to 7c are disposed at right angles to the axis of the hub 1, and the several working edges 13 to 13c and 14 to 14c are disposed at right angles to the plane of the spindles, it follows that the positions of the several parts encompassing the device relative to these gauge plates, clearly indicates and quickly discloses any deviation from the normal.

It is to be understood, of course, that while we have herein shown and described but one specific embodiment of our invention, changes in form, construction, and method of assembly and operation, may be made within the scope of the appended claims. It is also to be understood that while the device has been particularly described in connection with the adjustment of brake shoes, it may be used with equal success for other analogous purposes.

We claim:

1. A device of the character described comprising, a bearing member mountable upon a vehicle axle and having centralizing means associated therewith and adapted to be fixedly mounted on the axle, a hub adapted to slidably engage the bearing member, radially adjustable gauge members associated with the hub, and actuating means for the gauge members centralized on the hub.

2. The combination with a member having a threaded terminal portion provided with an indentation in the center of its end, of an element slidably mounted on the member and tapped to receive the threaded terminal portion of said member, and a set screw engaging the tapped portion of the element and disposed to seat in the said indentation.

FRED V. CLANCY.
LLOYD E. FREEMAN.